United States Patent [19]
Shiell et al.

[11] Patent Number: 6,065,113
[45] Date of Patent: May 16, 2000

[54] CIRCUITS, SYSTEMS, AND METHODS FOR UNIQUELY IDENTIFYING A MICROPROCESSOR AT THE INSTRUCTION SET LEVEL EMPLOYING ONE-TIME PROGRAMMABLE REGISTER

[75] Inventors: Jonathan H. Shiell, Plano; Joel J. Graber; Donald E. Steiss, both of Richardson, all of Tex.

[73] Assignee: Texas Instruments Incorporated, Dallas, Tex.

[21] Appl. No.: 08/813,887

[22] Filed: Mar. 7, 1997

[51] Int. Cl.[7] .................................................. G06F 9/00
[52] U.S. Cl. ............................................................ 712/227
[58] Field of Search .............................. 395/568, 800.42; 712/227, 42

[56] References Cited

U.S. PATENT DOCUMENTS

| | | | |
|---|---|---|---|
| 5,671,435 | 9/1997 | Alpert | 395/800.38 |
| 5,732,207 | 3/1998 | Allen et al. | 395/182.03 |
| 5,774,544 | 6/1998 | Lee et al. | 380/4 |
| 5,790,663 | 8/1998 | Lee et al. | 380/4 |
| 5,794,066 | 8/1998 | Dreyer et al. | 395/800.42 |

OTHER PUBLICATIONS

Intel, Pentium Pro Family Developer's Manual, vol. 2: Programmer's Reference Manual, Dec., 1995, pp. 11–73 to 11–79.

*Primary Examiner*—Richard L. Ellis
*Attorney, Agent, or Firm*—Robert D. Marshall, Jr.; Gerald E. Laws; Richard L. Donaldson

[57] ABSTRACT

In a method embodiment (10), the method operates a microprocessor (110), and the microprocessor has an instruction set. The method first (11) stores an identifier code uniquely identifying the particular microprocessor in a one-time programmable register. The method second (12) issues to the microprocessor an identifier request instruction from the instruction set. The method then, and in response to the identifier request instruction, provides (18) from the microprocessor an identifier code. Other circuits, systems, and methods are also disclosed and claimed.

49 Claims, 2 Drawing Sheets

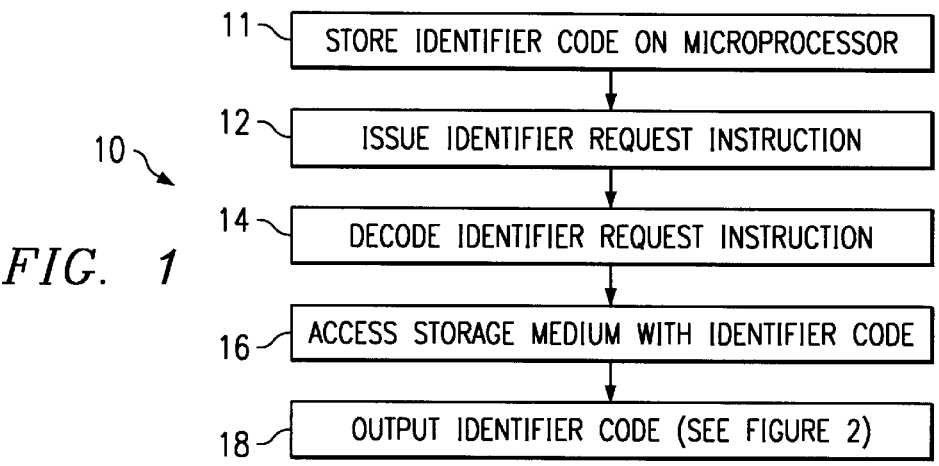
FIG. 1
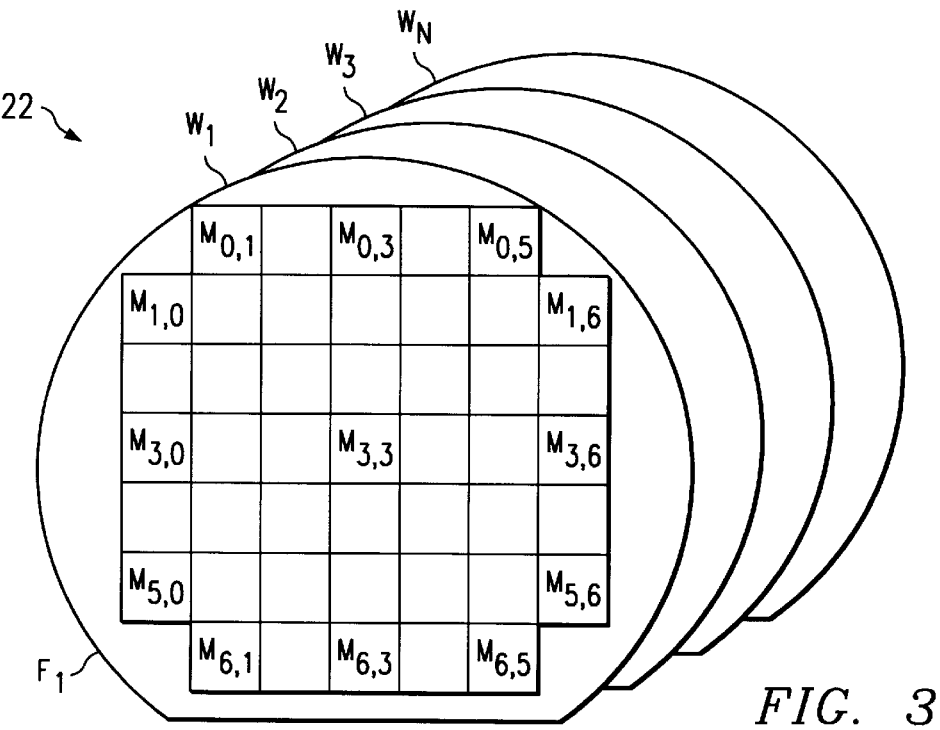
FIG. 2
FIG. 3

CIRCUITS, SYSTEMS, AND METHODS FOR UNIQUELY IDENTIFYING A MICROPROCESSOR AT THE INSTRUCTION SET LEVEL EMPLOYING ONE-TIME PROGRAMMABLE REGISTER

TECHNICAL FIELD OF THE INVENTION

The present embodiments relate to microprocessor systems, and are more particularly directed to circuits, systems, and methods for uniquely identifying a microprocessor at the instruction set level.

BACKGROUND OF THE INVENTION

The embodiments described below involve the field of microprocessor identification in computer systems. Microprocessor-based computer systems have become incredibly prolific and are used at all levels of the public and private sector. With the vast increase of microprocessors in circulation, there sometimes arises the need to identify various details about the microprocessor within a system. Moreover, this identification process is preferably achieved electronically as opposed to some physical and/or external indication such as a bar code or printed label. For example, in the Intel x86 microprocessors, there is included an instruction at the instruction set architecture ("ISA") level known as CPUID. As known in the art, the CPUID instruction provides information to software including the vendor, family, model, and stepping of the microprocessor on which it is executing. This information may then be used by the software for purposes known in the art.

Other systems include certain electronic identification techniques. For example, some systems by IBM include a storage device separate from the microprocessor, where a system level identifier is stored in that separate storage device. This system, however, suffers various drawbacks. For instance, the identifier only identifies the system and not necessarily the specific microprocessor included within that system. In addition, because the identifier is in a storage device apart from the microprocessor, the identifier may fail its purpose if either the storage device or the microprocessor is replaced without updating the identifier in the storage device to reflect this changing event. As another example of current systems, some microprocessors include an identifier which is accessible via the JTAG scan. This approach, however, also suffers various drawbacks. For example, the JTAG scan is commonly a technique requiring access to a particular microprocessor port and with particularized equipment In addition, the JTAG scan may only be performed meaningfully given knowledge about the scan chain of the scanned registers. Still further, this technique is commonly only used at the development and manufacturing stage.

In view of the above, there arises a need to address the drawbacks of current systems.

SUMMARY OF THE INVENTION

The present embodiments relate to microprocessor systems, and are more particularly directed to circuits, systems, and methods for uniquely identifying a microprocessor at the instruction set level. In a method embodiment, the method operates a microprocessor, and the microprocessor has an instruction set. The method first issues to the microprocessor an identifier request instruction from the instruction set. The method then, and in response to the identifier request instruction, provides from the microprocessor an identifier code. The identifier code uniquely identifies the microprocessor. Other circuits, systems, and methods are also disclosed and claimed.

BRIEF DESCRIPTION OF THE DRAWINGS

FIG. 1 illustrates a flowchart of a method embodiment which may be used with a microprocessor to uniquely identify the microprocessor using an instruction from the microprocessor instruction set;

FIG. 2 illustrates the preferred information included within the unique identifier code of the microprocessor;

FIG. 3 diagrammatically illustrates a lot of semiconductor wafers, with one of those wafers further demonstrating the formation and location of microprocessors along the wafer.

DETAILED DESCRIPTION OF THE PREFERRED EMBODIMENTS

Figure 4:
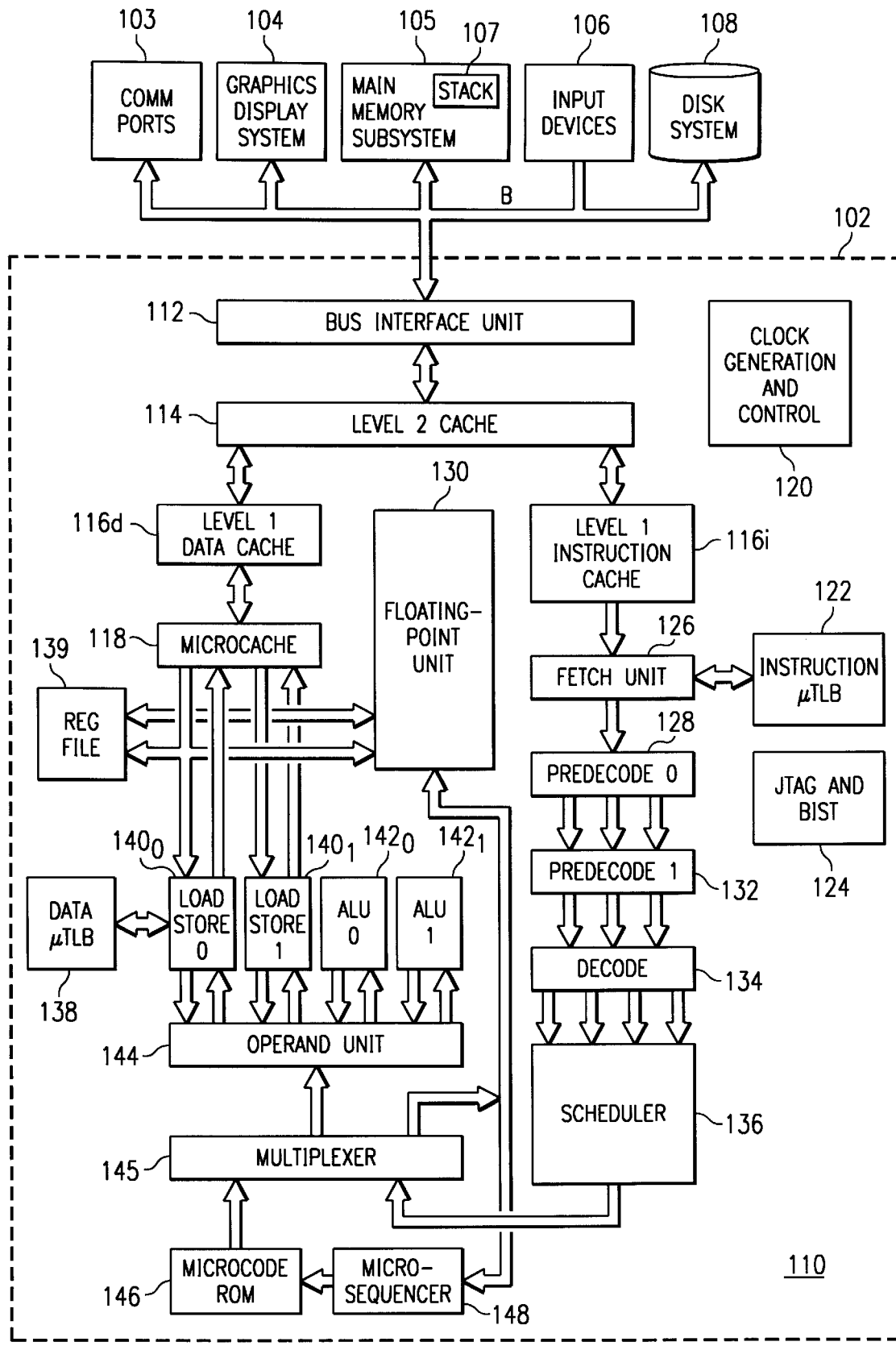
FIG. 4 illustrates an exemplary data processing system within which the preferred embodiments may be implemented.

Although either the CPUID instruction or the IBM system described in the above Background provide some information about the microprocessor which executes that instruction, the inventors of the present embodiments have discovered that such information by itself may be insufficient in certain instances. Indeed, the present inventors have further discovered that as microprocessor systems advance in development and complexity, it may be desirable to identify more information about a microprocessor than that provided by the CPUID instruction or by the IBM system. For example, the inventors of the present embodiments believe it highly beneficial to be able to uniquely and electronically identify each microprocessor, that is, in a manner where each microprocessor is uniquely distinguished from all other microprocessors. In contrast, the information output in response to the CPUID instruction does not accomplish this functionality. Thus, the following embodiments seek to provide such functionality, and include it at the ISA level.

FIG. 1 illustrates a flowchart of a method embodiment designated generally at 10 and which may be used with a microprocessor in accordance with the principles described below; note also that an example of such a microprocessor is described later in connection with FIG. 4. Before discussing the details of method 10 as well as the exemplary microprocessor of FIG. 4, note in general that the embodiments below operate to uniquely identify the microprocessor at the instruction set architecture ("ISA") level. Various benefits from these embodiments are set forth below, and still additional such benefits will be apparent to a person skilled in the art.

Method 10 begins with step 11, where a code is stored on the microprocessor chip and which uniquely identifies the microprocessor. For purposes of this document, this information is referred to as an identifier code. In the preferred embodiment, and as detailed below, this identifier code constitutes several groups of bits stored in a dedicated register included on the microprocessor chip. These groups of bits, when viewed together, form a pattern which is unique to the particular microprocessor which stores those bits. FIG. 2, discussed below, sets forth the preferred information of these bit groups. In the preferred embodiment, note that step 11 is performed at the stage where the microprocessor is manufactured. For example, and as detailed below, the identifier code is preferably stored to a one-time programmable register on the microprocessor. Once this event occurs, steps 12 through 18 may be performed by operating the microprocessor as discussed below.

Step 12 issues an instruction to the microprocessor at the ISA level and to cause the microprocessor to uniquely identify itself as described below. For purposes of this document, such an instruction, or a like instruction which accomplishes this functionality, is referred to as an identifier request instruction. In the preferred embodiment, the identifier request instruction is included within the instruction set of the microprocessor and, therefore, the instruction may be issued to the microprocessor by any feature having access to the ISA level of the microprocessor. For example, the identifier request instruction may be issued by a computer BIOS, an operating system, or an application program. In the preferred embodiment the identifier request instruction is a dedicated instruction which, as detailed below, operates as a request to read a register within the microprocessor; however, other instructions which perform the operations set forth below may be used in lieu of the preferred embodiment. For example, the CPUID instruction described in the above Background may be extended to achieve this functionality.

Step 14 decodes the identifier request instruction according to principles known in the art, and according to the particular decoding techniques applicable to the particular microprocessor which is processing the instruction. The description of FIG. 4, below, sets forth the decoding operation in accordance with the preferred embodiment.

Step 16 operates in response to the instruction issuance and decode step by accessing the identifier code stored on the microprocessor chip. This access step operates to allow reading of whatever resource is storing the identifier code. Thus, lastly in step 18, method 10 outputs the microprocessor identifier code. This information may be used internally for further processing by the microprocessor, or may be output externally for use by features such as those set forth above (i.e., BIOS, operating system, application program). Given this access, therefore, one skilled in the art will appreciate various benefits from having access to a unique identification of the microprocessor. For example, if a manufacturer learns of the same or similar operation problem within a group of different but uniquely identified microprocessors, the manufacturer may be better able to ascertain the commonality giving rise to the problem with those microprocessors. For instance, the manufacturer may determine that each of the problematic microprocessors were manufactured at the same facility and, therefore, that the particular facility should be reviewed to better understand the cause of the operation problem. As another example, it is unfortunately the case that microprocessor theft has vastly increased in recent years. Because the present inventive embodiments provide a unique identification for each microprocessor, microprocessors manufactured in accordance with the present embodiments may be traced and identified in the event of such a theft. As yet another example, unique identification of a microprocessor may permit a software seller to license software on a per microprocessor basis. Still other examples of benefits are either given below, or will be ascertainable by a person skilled in the art.

FIG. 2 illustrates the preferred identifier code 20 which is stored in a dedicated microprocessor register as described below, and which is output in step 18 as described above. As shown, identifier code 20 preferably includes 61 bits of information, which are separated into six separate groups designated 20a through 20f. Each of these bit groups is discussed below. Before discussing those groups, note that the register which stores identifier code 20 may exceed 61 bits and, in this instance, other information may be stored in that register to take advantage of the additional bit storage available in a dedicated register. For purposes of the present embodiments, however, only those bits shown in FIG. 2 are discussed.

Bit groups 20a through 20e are better understood by first reviewing various known principles as reflected in FIG. 3, and then returning to those groups. Particularly, FIG. 3 diagrammatically illustrates a lot 22 of semiconductor wafers. Note that FIG. 3 is simplified and not drawn to scale, but diagrammatically demonstrates the principles necessary to demonstrate various aspects of the present embodiments. Each wafer in FIG. 3 is designated separately by a capital "W" combined with a subscript designating that lot 22 includes N wafers. Further, each wafer W is of the type which is typical to construct microprocessors. Further, such wafers may be of various types, sizes, shapes and so forth, but commonly each is collected in a group known as a lot. Typically, a lot of wafers are assigned a lot number for tracking during the manufacturing process. Each wafer typically includes a reference point, such as a flat region which from the perspective of FIG. 3 is visible only on wafer $W_1$ and designated as $F_1$. Also as known in the art, each wafer lot such as lot 22 is processed at a fabrication facility in order to construct semiconductor chip devices. In the present embodiments, these chip devices are microprocessors which operate in accordance with the principles set forth in this document. Moreover, a plurality of microprocessors are formed on each such wafer, again according to whatever appropriate technique. For purposes of illustration, therefore, the perspective of FIG. 3 shows various boxes along wafer $W_1$, with each such box depicting diagrammatically a microprocessor manufactured on wafer $W_1$. For identification purposes, the location of each microprocessor on a given wafer is preferably assigned according to an X-Y coordinate system. As examples, therefore, note that certain microprocessors on wafer $W_1$ include a specific designation including a capital "M" and an "x,y" subscript. The "M" indicates that the die is a microprocessor while the "x,y" indicates the location of the microprocessor along the corresponding wafer. Note also that to simplify FIG. 3, only a few such designations are included. Moreover, due to the circular shape of each wafer and the orientation of the rows relative to the flat $F_1$, certain rows along with wafer will include more columns than others. Typically, the numbering of rows and columns is relative to the row or rows containing the largest number of microprocessors along that row. For example, the second row shown in FIG. 3 includes seven microprocessors and the far left microprocessor is designated in column 0 of that row; however, for the first row immediately above it and due to the circular shape of that row, there is no microprocessor at the zero location of the row and, instead, the first numbered microprocessor in the first row is in column 1 rather than column 0. Of course, this numbering scheme is only by way of example, and others could be implemented by a person skilled in the art so that each microprocessor has a unique location coding along its corresponding semiconductor wafer.

Returning now to FIG. 2, and given the illustration of FIG. 3, groups 20a through 20e are better understood. Note that each of these groups in the preferred embodiment reflect information regarding the manufacturing location of the microprocessor. First, groups 20a and 20b specify the x and y coordinate, respectively, of the microprocessor on its corresponding wafer. For example, if the microprocessor located on the far left of the top row of FIG. 3 returned its identifier code 20, groups 20a and 20b would indicate, in whatever preferred manner, the x and y coordinates of 0 and 1, respectively. Second, group 20c identifies the number of the wafer within lot 22 on which the microprocessor was manufactured. Thus, in the instance of FIG. 3, group 20c would designate one of the wafers of the wafers indicated at $W_1$ through $W_N$. Third, group 20d identifies the lot number of lot 22 assigned to the particular wafer which included the microprocessor at issue. Fourth, group 20e identifies the facility where the particular microprocessor was manufactured.

As demonstrated above, the preferred information within identifier code 20 designates, for a given microprocessor, a single location along a single wafer within a single wafer lot and at a single fabrication facility. Note that this information may be particularly beneficial for purposes of identifying operability problems with certain microprocessors. For example, if a group of microprocessors is identified having a common problem, statistical analyses may be performed on the above information to determine whether there is commonality of one of the above factors for those microprocessors have the same or similar operability problems. For instance, it may be determined that all, or most, of the problematic microprocessors came from a single lot of wafers. In another instance, it may be determined that all, or most, of the problematic microprocessors were located at a common x-y coordinate along various different wafers. Still other instances will be ascertainable by a person skilled in the art and, indeed, could be further enhanced if the particular type of information included within the identifier code were expanded by such a person. Thus, these additional advantages further demonstrate the inventive scope of the present embodiments.

From the above, note also that groups that groups 20a through 20e may be combined to form a code which uniquely identifies the microprocessor. In other words, assuming correct encoding of those bits, those groups in combination should provide a series of bits which is unique for each microprocessor because only one microprocessor will be at a single location along a single wafer within a single wafer lot and at a single fabrication facility. In addition, each of those groups, as well as group 20f provides additional functionality as set forth above for each respective group. Note, however, that one skilled in the art could select less than all of those groups, or even alternative groups, and still achieve aspects of the inventive scope set forth herein. For example, the preferred embodiment described above involves manufacture of wafers in lots, which typically occurs using various mask sets for that lot. As an alternative, however, individual wafers may be constructed alone and not in lots, such as by using e-beam lithography. In this instance, alternative information could be written to each microprocessor to identify the particular instance of the lithographic formation of the microprocessor so that that instance, as well as the microprocessor itself, may be distinguished from other microprocessors and other instances of forming a microprocessor using the same or similar lithographic processes.

Completing the groups of FIG. 2, group 20f is an eighteen bit error correction code. Particularly, and as mentioned previously, in the preferred embodiment each bit of the identifier code is stored in a one-time programmable storage medium on the microprocessor. This medium is preferably a register which, during manufacture of the microprocessor, includes a number of fuses where the total number of fuses exceeds the number of bits necessary to uniquely identify the microprocessor. In order to encode the identifier code on the microprocessor, selected ones of the fuses are broken during the manufacturing stage. In the preferred embodiment, this selective breaking of fuses is achieved using a laser, as in the same manner as is known in the memory fabrication art. Indeed, note in the preferred embodiment described below in connection with FIG. 4 that the microprocessor preferably includes various cache structures. Some or all of these cache structures are preferably also constructed using the same fuse technique and, therefore, the additional cost of using that technique to encode the identifier code is substantially less than that compared to a microprocessor which is otherwise being constructed without that technique. Note further that in certain instances it may occur that one or more of the fuses, either before or after the initial fuse breaking operation, is erroneously configured; therefore, the erroneous fuses will not properly convey the intended information for the identifier code. As a result, the error correction code represented by group 20f permits selective changing of this bit group to indicate the erroneous configuration of the fuses and to provide the corrected information. Note that this feature is particularly beneficial because, without this aspect, the microprocessor would include only the minimal number of fuses to encode the identifier code; however, in such event, if it were learned that one of these limited number of fuses were erroneously configured, either the microprocessor would have to be discarded or it would not operate to output a correct identifier code.

In addition to the above, note that the one-time programmable storage medium on the microprocessor which stores the identifier code may be constructed by techniques other than fuses, and even if fuses are used, they may be created or broken by techniques other than laser breaking. As one example, fuses could be created but selectively broken with current. As another example, anti-fuses could be used to selectively form fuses to encode the preferred information. As another example, an EPROM could be used. As yet another example, if the e-beam lithography technology described above, or some like technology, were used to manufacture the microprocessor, then the beam could be written to directly encode the identifier onto the microprocessor. Still other techniques will be ascertainable to a person skilled in the art.

In another aspect of the present invention, each microprocessor having a unique identifier code stored in a register such as that set forth above will further include a dedicated register in addition to the fuse register, where that additional register however is of a more common read/write type register such as a static latch. Further, in this embodiment, the contents of the fuse register are copied at some point to the read/write type register, such as during reset of the microprocessor. Thereafter, the unique identifier code may be read from the read/write type register rather than the fuse register. Note that this additional aspect is beneficial for various reasons. For example, the fuse register is likely to consume a relatively larger amount of current; therefore, the copied information may instead be maintained and read (after the initial copy) in connection with the read/write type register, thereby reducing overall power consumption of the microprocessor and, more significantly, reducing standby power consumption as well.

Having described the above embodiments, FIG. 4 illustrates a block diagram of a microprocessor embodiment into which the above embodiments may be incorporated. Referring now to FIG. 4, an exemplary data processing system 102, including an exemplary superscalar pipelined microprocessor 110 within which the preferred embodiment is implemented, will be described. It is to be understood that the architecture of system 102 and of microprocessor 110 is described herein by way of example only, as it is contemplated that the present embodiments may be utilized in microprocessors of various architectures. It is therefore contemplated that one of ordinary skill in the art, having reference to this specification, will be readily able to implement the present embodiments in such other microprocessor architectures.

Microprocessor 110, as shown in FIG. 4, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. System 102 contains such conventional subsystems as communication ports 103 (including modem ports and modems, network interfaces, and the like), graphics display system 104 (including video memory, video processors, a graphics monitor), main memory system 105 which is typically implemented by way of dynamic random access memory (DRAM) and includes a stack 107, input devices 106 (including keyboard, a pointing device, and the interface circuitry therefor), and disk system 108 (which may include hard disk drives, floppy disk drives, and CD-ROM drives). It is therefore contemplated that system 102 of FIG. 4 corresponds to a conventional desktop computer or workstation, as are now common in the art. Of course, other system implementations of microprocessor 110 can also benefit from the present embodiments, as will be recognized by those of ordinary skill in the art.

Microprocessor 110 includes a bus interface unit ("BIU") 112 that is connected to bus B, and which controls and effects communication between microprocessor 110 and the other elements in system 102. BIU 112 includes the appropriate control and clock circuitry to perform this function, including write buffers for increasing the speed of operation, and including timing circuitry so as to synchronize the results of internal microprocessor operation with bus B timing constraints. Microprocessor 110 also includes clock generation and control circuitry 120 which, in this exemplary microprocessor 110, generates internal clock phases based upon the bus clock from bus B; the frequency of the internal clock phases, in this example, may be selectably programmed as a multiple of the frequency of the bus clock.

As is evident in FIG. 4, microprocessor 110 has three levels of internal cache memory, with the highest of these as level 2 cache 114, which is connected to BIU 112. In this example, level 2 cache 114 is a unified cache, and is configured to receive all cacheable data and cacheable instructions from bus B via BIU 112, such that much of the bus traffic presented by microprocessor 110 is accomplished via level 2 cache 114, Of course, microprocessor 110 may also effect bus traffic around cache 114, by treating certain bus reads and writes as "not cacheable". Level 2 cache 114, as shown in FIG. 4, is connected to two level 1 caches 116; level 1 data cache $116_d$ is dedicated to data, while level 1 instruction cache $116_i$ is dedicated to instructions. Power consumption by microprocessor 110 is minimized by only accessing level 2 cache 114 only in the event of cache misses of the appropriate one of the level 1 caches 116. Furthermore, on the data side, microcache 118 is provided as a level 0 cache, and in this example is a fully dual-ported cache.

As shown in FIG. 4 and as noted hereinabove, microprocessor 110 is of the superscalar type. In this example multiple execution units are provided within microprocessor 110, allowing up to four instructions to be simultaneously executed in parallel for a single instruction pointer entry. These execution units include two ALUs $144_0$, $144_2$ for processing conditional branch, integer, and logical operations, floating-point unit (FPU) 130, two load-store units $140_0$, $140_1$, and microsequencer 148. The two load-store units 140 utilize the two ports to microcache 118, for true parallel access thereto, and also perform load and store operations to registers in register file 139. Data microtranslation lookaside buffer ($\mu$TLB) 138 is provided to translate logical data addresses into physical addresses, in the conventional manner.

These multiple execution units are controlled by way of multiple pipelines with seven stages each, with write back. The pipeline stages are as follows:

F Fetch: This stage generates the instruction address and reads the instruction from the instruction cache or memory PD0 Predecode stage 0: This stage determines the length and starting position of up to three fetched x86-type instructions PD1 Predecode stage 1: This stage extracts the x86 instruction bytes and recodes them into fixed length format for decode DC Decode: This stage translates the x86 instructions into atomic operations (AOps)

SC Schedule: This stage assigns up to four AOps to the appropriate execution units OP Operand: This stage retrieves the register operands indicated by the AOps EX Execute: This stage runs the execution units according to the AOps and the retrieved operands WB Write back: This stage stores the results of the execution in registers or in memory Referring back to FIG. 4, the pipeline stages noted above are performed by various functional blocks within microprocessor 110. Fetch unit 126 generates instruction addresses from the instruction pointer, by way of instruction microtranslation lookaside buffer ($\mu$TLB) 122, which translates the logical instruction address to a physical address in the conventional way, for application to level 1 instruction cache $116_i$. Instruction cache $116_i$ produces a stream of instruction data to fetch unit 126, which in turn provides the instruction code to the predecode stages in the desired sequence. Speculative execution is primarily controlled by fetch unit 126, in a manner to be described in further detail hereinbelow.

Predecoding of the instructions is broken into two parts in microprocessor 110, namely predecode 0 stage 128 and predecode 1 stage 132. These two stages operate as separate pipeline stages, and together operate to locate up to three x86 instructions and apply the same to decoder 134. As such, the predecode stage of the pipeline in microprocessor 110 is three instructions wide. Predecode 0 unit 128, as noted above, determines the size and position of as many as three x86 instructions (which, of course, are variable length), and as such consists of three instruction recognizers; predecode 1 unit 132 recodes the multi-byte instructions into a fixed-length format, to facilitate decoding.

Decode unit 134, in this example, contains four instruction decoders, each capable of receiving a fixed length x86 instruction from predecode 1 unit 132 and producing from one to three atomic operations (AOps); AOps are substantially equivalent to RISC instructions. Three of the four decoders operate in parallel, placing up to nine AOps into the decode queue at the output of decode unit 134 to await scheduling; the fourth decoder is reserved for special cases. Scheduler 136 reads up to four AOps from the decode queue at the output of decode unit 134, and assigns these AOps to the appropriate execution units. In addition, the operand unit 144 receives and prepares the operands for execution. As indicated in FIG. 4, operand unit 144 receives an input from scheduler 136 and also from microcode ROM 146, via multiplexer 145, and fetches register operands for use in the execution of the instructions. In addition, according to this example, operand unit performs operand forwarding to send results to registers that are ready to be stored, and also performs address generation for AOps of the load and store type.

Microsequencer 148, in combination with microcode ROM 146, control ALUs 142 and load/store units 140 in the execution of microcode entry AOps, which are generally the last AOps to execute in a cycle. In this example, microsequencer 148 sequences through microinstructions stored in microcode ROM 146 to effect this control for those microcoded microinstructions. Examples of microcoded microinstructions include, for microprocessor 110, complex or rarely-used x86 instructions, x86 instructions that modify segment or control registers, handling of exceptions and interrupts, and multi-cycle instructions (such as REP instructions, and instructions that PUSH and POP all registers).

Microprocessor 110 also includes circuitry 124 for controlling the operation of JTAG scan testing, and of certain built-in self-test functions, ensuring the validity of the operation of microprocessor 110 upon completion of manufacturing, and upon resets and other events.

Given the description of FIG. 4, as well as the descriptions above such as those relating to the prior Figures, one skilled in the art may appreciate that method 10 of FIG. 1, and the additional embodiments to accomplish the descriptions accompanying it as described in connection with FIGS. 2 and 3, may be incorporated in connection with various components shown in FIG. 4. For example, microprocessor 110 could be used as any microprocessor shown within FIG. 3. Various related functionality may be further performed by the appropriate circuitry within FIG. 4.

From the above, it may be appreciated that the above embodiments provide circuits, systems, and methods for uniquely identifying a microprocessor at the instruction set level. Various benefits have been set forth above and others will be appreciated by a person skilled in the art. Still further, the while the present embodiments have been described in detail, various substitutions, modifications or alterations could be made to the descriptions set forth above without departing from the inventive scope. In addition to the many examples set forth above, in another example the various information encoded in the identifier code could be changed. As another example, the identifier code may be stored in a medium other than a one-time programmable register. Still further, as stated above, the identifier code could be encoded in a register using a configuration other than laser fuses. As yet another example, the identifier request instruction could include functionality in addition to that set forth above. The examples as well as others ascertainable by a person skilled in the art further demonstrate the flexibility and span of the inventive scope, as further demonstrated by the following claims.

What is claimed is:

1. A method of operating a microprocessor, wherein the microprocessor comprises an instruction set, the method comprising the steps of:

first, following manufacture of the microprocessor storing a identifier code uniquely identifying the particular microprocessor in a one-time programmable register in the microprocessor;

second, issuing to the microprocessor an identifier request instruction from the instruction set; and third, in response to the identifier request instruction, reading from the one-time programmable register of the microprocessor the identifier code.

2. The method of claim 1 wherein the microprocessor comprises one of a plurality of microprocessors manufactured on a wafer, and wherein said step of storing the identifier code comprises storing a location of the microprocessor on the wafer upon which the microprocessor is manufactured.

3. The method of claim 2 wherein said step of storing the location of the microprocessor on the wafer comprises storing an X-Y coordinate location of the microprocessor on the wafer upon which the microprocessor is manufactured.

4. The method of claim 1 wherein the microprocessor is manufactured on a wafer, and wherein said step of storing the identifier code comprises storing an identifier of the wafer upon which the microprocessor is manufactured.

5. The method of claim 1 wherein the microprocessor is manufactured on a wafer, wherein the wafer comprises one of plurality of wafers comprising a lot of wafers, and wherein said step of storing identifier code comprises storing an identifier of the lot of wafers within which the microprocessor is manufactured.

6. The method of claim 1 wherein the microprocessor is manufactured at a facility, and wherein said step of storing the identifier code comprises storing an identifier of the facility within which the microprocessor is manufactured.

7. The method of claim 1 wherein the microprocessor comprises one of a plurality of microprocessors manufactured on a wafer, and wherein said step of storing the identifier code comprises:

storing a location of the microprocessor on the wafer upon which the microprocessor is manufactured; and storing an identifier of the wafer upon which the microprocessor is manufactured.

8. The method of claim 7 wherein the wafer comprises one of plurality of wafers comprising a lot of wafers, and wherein said step of storing the identifier code comprises storing an identifier of the lot of wafers within which the microprocessor is manufactured.

9. The method of claim 7 wherein the microprocessor is manufactured at a facility, and wherein said step of storing the identifier code comprises storing an identifier of the facility within which the microprocessor is manufactured.

10. The method of claim 1 wherein the microprocessor comprises one of a plurality of microprocessors manufactured on a wafer, wherein the wafer comprises one of plurality of wafers comprising a lot of wafers, wherein the microprocessor is manufactured at a facility and wherein said step of storing the identifier code comprises:

storing a location of the microprocessor on the wafer upon which the microprocessor is manufactured;

storing an identifier of the wafer upon which the microprocessor is manufactured;

storing an identifier of the lot of wafers within which the microprocessor is manufactured; and storing an identifier of the facility within which the microprocessor is manufactured.

11. The method of claim 1 wherein the one-time programmable register comprises a plurality of fuses on the microprocessor and wherein said storing step comprises breaking selected ones of the plurality of fuses to form the identifier code.

12. The method of claim 11 wherein said step of breaking selected ones of the plurality of fuses to form the identifier code comprises selectively exposing the selected ones of the plurality of fuses to a laser beam such that the selectively exposed fuses are selectively broken.

13. The method of claim 11 wherein the identifier code comprises a number of bits, wherein the plurality of fuses comprises a number of fuses, and wherein the number of fuses exceeds the number of bits.

14. The method of claim 13 wherein said step of storing the identifier code comprises storing an error correction code.

15. The method of claim 1 and further comprising the step, after said storing step and prior to said second step, the step of copying the identifier code from the one-time programmable register on the microprocessor to a read/write register, and wherein said step of reading the identifier code comprises reading from the read/write type register the identifier code.

16. The method of claim 15, wherein the step of copying the identifier code from the one-time programmable register on the microprocessor to a read/write register includes selectively powering the one-time programmable register until said step of copying is complete and thereafter not powering the one-time programmable register.

17. A method of operating a microprocessor, wherein the microprocessor comprises an instruction set, the method comprising the steps of:
  first, following manufacture of the microprocessor storing a identifier code uniquely identifying the particular microprocessor in a one-time programmable register in the microprocessor;
  second, issuing to the microprocessor an identifier request instruction from the instruction set, wherein said step of issuing comprises issuing to the microprocessor a request to read the one-time programmable register in the microprocessor; and
  third, in response to the identifier request instruction, reading the identifier code from the one-time programmable register.

18. The method of claim 17 wherein the microprocessor comprises one of a plurality of microprocessors manufactured on a wafer, wherein the wafer comprises one of plurality of wafers comprising a lot of wafers, wherein the microprocessor is manufactured at a facility and wherein said step of storing the identifier code comprises:
  storing a location of the microprocessor on the wafer upon which the microprocessor is manufactured;
  storing an identifier of the wafer upon which the microprocessor is manufactured;
  storing an identifier of the lot of wafers within which the microprocessor is manufactured; and
  storing an identifier of the facility within which the microprocessor is manufactured.

19. The method of claim 17 wherein the one-time programmable register comprises a plurality of fuses on the microprocessor and, said first step further comprising the step of breaking selected ones of the plurality of fuses to form the identifier code, wherein said step of breaking selected ones of the plurality of fuses to form the identifier code comprises selectively exposing the selected ones of the plurality of fuses to a laser beam such that the selectively exposed fuses are selectively broken.

20. A microprocessor for operating in response to an instruction set, said microprocessor comprising:
  a one-time programmable register having stored therein following manufacture of the microprocessor an identifier code uniquely identifying said particular microprocessor;
  circuitry for first issuing an identifier request instruction from the instruction set; and
  circuitry for second, and in response to the identifier request instruction, reading said identifier code from said one-time programmable register of said microprocessor.

21. The microprocessor of claim 20 wherein the microprocessor comprises one of a plurality of microprocessors manufactured on a wafer, and wherein said identifier code stored in said ont-time programmable register comprises a location of the microprocessor on the wafer upon which the microprocessor is manufactured.

22. The microprocessor of claim 21 wherein said location of the microprocessor on the wafer comprises an X-Y coordinate location of the microprocessor on the wafer upon which the microprocessor is manufactured.

23. The microprocessor of claim 20 wherein the microprocessor is manufactured on a wafer, and wherein said identifier code comprises an identifier of the wafer upon which the microprocessor is manufactured.

24. The microprocessor of claim 20 wherein the microprocessor is manufactured on a wafer, wherein the wafer comprises one of plurality of wafers comprising a lot of wafers, and wherein said identifier code comprises an identifier of the lot of wafers within which the microprocessor is manufactured.

25. The microprocessor of claim 20 wherein the microprocessor is manufactured at a facility, and wherein said identifier code comprises an identifier of the facility within which the microprocessor is manufactured.

26. The microprocessor of claim 20 wherein the microprocessor comprises one of a plurality of microprocessors manufactured on a wafer, and wherein said identifier code comprises:
  a location of the microprocessor on the wafer upon which the microprocessor is manufactured; and
  an identifier of the wafer upon which the microprocessor is manufactured.

27. The microprocessor of claim 26 wherein the wafer comprises one of plurality of wafers comprising a lot of wafers, and wherein said identifier code comprises an identifier of the lot of wafers within which the microprocessor is manufactured within which the microprocessor is manufactured.

28. The microprocessor of claim 26 wherein the microprocessor is manufactured at a facility, and wherein said identifier code comprises an identifier of the facility within which the microprocessor is manufactured.

29. The microprocessor of claim 20 wherein the microprocessor comprises one of a plurality of microprocessors manufactured on a wafer, wherein the wafer comprises one of plurality of wafers comprising a lot of wafers, wherein the microprocessor is manufactured at a facility and wherein said an identifier code comprises:
  a location of the microprocessor on the wafer upon which the microprocessor is manufactured;
  an identifier of the wafer upon which the microprocessor is manufactured;
  an identifier of the lot of wafers; and
  an identifier of the facility within which the microprocessor is manufactured.

30. The microprocessor of claim 26 wherein the one-time programmable storage medium comprises a plurality of fuses.

31. The microprocessor of claim 30 wherein the plurality of fuses comprise a plurality of laser-breakable fuses.

32. The microprocessor of claim 30 wherein the identifier code comprises a number of bits, wherein the plurality of fuses comprises a number of fuses, and wherein the number of fuses exceeds the number of bits.

33. The microprocessor of claim 32 wherein said circuitry for reading said identifier code comprises circuitry for reading an error correction code.

34. The microprocessor of claim 20 wherein said circuitry for reading said identifier code comprises:
 a read/write register; and
 circuitry for copying the identifier code from the one-time programmable storage medium on the microprocessor to said read/write register upon reset of the microprocessor.

35. The microprocessor of claim 34, wherein:
 said circuitry for copying the identifier code from the one-time programmable storage medium on the microprocessor to said read/write register upon reset of the microprocessor selectively powers the one-time programmable register until the copying is complete and thereafter removes power from the one-time programmable register.

36. A microprocessor for operating in response to an instruction set, said microprocessor comprising:
 a one-time programmable register having stored therein following manufacture of the microprocessor an identifier code uniquely identifying said particular microprocessor;
 circuitry for first issuing an identifier request instruction from the instruction set; and
 circuitry for second, and in response to the identifier request instruction, reading said identifier code from said one-time programmable register.

37. The microprocessor of claim 36 wherein the microprocessor comprises one of a plurality of microprocessors manufactured on a wafer, wherein the wafer comprises one of plurality of wafers comprising a lot of wafers, wherein the microprocessor is manufactured at a facility and wherein said identifier code comprises:
 a location of the microprocessor on the wafer upon which the microprocessor is manufactured;
 an identifier of the wafer upon which the microprocessor is manufactured;
 an identifier of the lot of wafers within which the microprocessor is manufactured; and
 an identifier of the facility within which the microprocessor is manufactured.

38. A microprocessor-based computer system, comprising:
 an input device;
 a display system;
 a main memory; and
 a microprocessor for operating in response to an instruction set, said microprocessor comprising:
  a one-time programmable register having stored therein following manufacture of said microprocessor an identifier code uniquely identifying said particular microprocessor;
  circuitry for first issuing an identifier request instruction from the instruction set; and
  circuitry for second, and in response to the identifier request instruction, reading said identifier code from the one-time programmable register of said microprocessor.

39. The system of claim 38 wherein the microprocessor comprises one of a plurality of microprocessors manufactured on a wafer, and wherein said identifier code comprises a location of the microprocessor on the wafer upon which the microprocessor is manufactured.

40. The system of claim 39 wherein said location of the microprocessor on the wafer comprises an X-Y coordinate location of the microprocessor on the wafer upon which the microprocessor is manufactured.

41. The system of claim 38 wherein the microprocessor is manufactured on a wafer, and wherein said identifier code comprises identifier of the wafer upon which the microprocessor is manufactured.

42. The system of claim 38 wherein the microprocessor is manufactured on a wafer, wherein the wafer comprises one of plurality of wafers comprising a lot of wafers, and wherein said identifier code comprises an identifier of the lot of wafers within which the microprocessor is manufactured.

43. The system of claim 38 wherein the microprocessor is manufactured at a facility, and wherein said identifier code comprises identifier of the facility within which the microprocessor is manufactured.

44. The system of claim 38 wherein the one-time programmable storage medium comprises a plurality of fuses.

45. The system of claim 44 wherein the plurality of fuses comprise a plurality of laser-breakable fuses.

46. The system of claim 44 wherein the identifier code comprises a number of bits, wherein the plurality of fuses comprises a number of fuses, and wherein the number of fuses exceeds the number of bits.

47. The system of claim 44 wherein said identifier code comprises an error correction code.

48. The system of claim 38 further comprising:
 a read/write register; and
 circuitry for copying said identifier code from said one-time programmable register on the microprocessor to said read/write register upon reset of the microprocessor.

49. The microprocessor of claim 48, wherein:
 said circuitry for copying the identifier code from the one-time programmable storage medium on the microprocessor to said read/write register upon reset of the microprocessor selectively powers the one-time programmable register until the copying is complete and thereafter removes power from the one-time programmable register.

* * * * *

UNITED STATES PATENT AND TRADEMARK OFFICE
CERTIFICATE OF CORRECTION

PATENT NO. : 6,065,113
DATED : 5/16/00
INVENTOR(S) : Jonathan H. Shiell, Joel J. Graber, Donald E. Steiss It is certified that error appears in the above-identified patent and that said Letters Patent is hereby corrected as shown below:

Cover Page, insert Item [60] under Related U.S. Application Data

--Provisional Application No. 60/013,053  March 8, 1996.--

Signed and Sealed this

Fifteenth Day of May, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO.    : 6,065,113                                    Page 1 of 1
DATED         : May 16, 2000
INVENTOR(S)   : Jonathan H. Shiell et al.

It is certified that error appears in the above-identified patent and that said Letters Patent is hereby corrected as shown below:

<u>Title page,</u>
Item [75], Inventors, should read

-- Jonathan H. Shiell, Plano, TX (US); Joel J. Graber, Richardson, TX (US); Donald E. Steiss, Richardson, TX (US); John C. Scarisbrick, Bedford, (UK) --

Signed and Sealed this

Twenty-seventh Day of January, 2004

JON W. DUDAS
*Acting Director of the United States Patent and Trademark Office*